United States Patent
Karenos et al.

(10) Patent No.: US 9,537,747 B2
(45) Date of Patent: Jan. 3, 2017

(54) PUBLISH/SUBSCRIBE OVERLAY NETWORK CONTROL SYSTEM

(75) Inventors: Kyriakos Karenos, New York, NY (US); Minkyong Kim, Scarsdale, NY (US); Hui Lei, Scarsdale, NY (US); Hao Yang, Scarsdale, NY (US); Fan Ye, Ossining, NY (US); Liangzhao Zeng, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 1673 days.

(21) Appl. No.: 12/814,426

(22) Filed: Jun. 11, 2010

(65) Prior Publication Data

US 2011/0307789 A1    Dec. 15, 2011

(51) Int. Cl.
| H04L 12/709 | (2013.01) |
| H04L 12/751 | (2013.01) |
| H04L 12/707 | (2013.01) |
| H04L 12/715 | (2013.01) |
| H04L 29/08  | (2006.01) |

(52) U.S. Cl.
CPC ............... *H04L 45/02* (2013.01); *H04L 45/24* (2013.01); *H04L 45/245* (2013.01); *H04L 45/64* (2013.01); *H04L 67/02* (2013.01)

(58) Field of Classification Search
USPC .................................................. 715/833–837
See application file for complete search history.

(56) References Cited

U.S. PATENT DOCUMENTS

| 6,275,470 | B1 * | 8/2001 | Ricciulli ........................ 370/238 |
| 7,289,531 | B2 * | 10/2007 | Van Den Bosch et al. .. 370/466 |
| 7,487,246 | B2 | 2/2009 | Astley et al. ................. 709/226 |
| 8,244,908 | B2 * | 8/2012 | Dempo .......................... 709/238 |
| 8,254,287 | B2 * | 8/2012 | Jayaram et al. .............. 370/254 |
| 8,396,949 | B2 * | 3/2013 | Bubolz et al. ................ 709/221 |
| 2004/0022194 | A1 * | 2/2004 | Ricciulli ........................ 370/238 |
| 2005/0268146 | A1 * | 12/2005 | Jin et al. ............................ 714/2 |
| 2006/0047784 | A1 * | 3/2006 | Li et al. ........................ 709/220 |
| 2006/0085507 | A1 * | 4/2006 | Zhao et al. ................... 709/206 |
| 2006/0087986 | A1 * | 4/2006 | Dube et al. ................... 370/255 |
| 2006/0277299 | A1 * | 12/2006 | Baekelmans et al. ........ 709/224 |
| 2007/0087756 | A1 | 4/2007 | Hoffberg ....................... 455/450 |
| 2007/0143442 | A1 | 6/2007 | Zhang et al. ................. 709/217 |
| 2008/0177880 | A1 | 7/2008 | Ginis ............................. 709/226 |
| 2008/0184262 | A1 * | 7/2008 | Ginis et al. ................... 719/314 |

(Continued)

OTHER PUBLICATIONS

Han et al, Topolog Aware Overlay Networks, University of Michigan, Jan. 12, 2005.*

(Continued)

*Primary Examiner* — Ryan Pitaro
(74) *Attorney, Agent, or Firm* — Ido Tuchman; Mercedes L. Hobson

(57) ABSTRACT

A system may include an overlay network linking a plurality of publishers, a plurality of subscribers, and a plurality of brokers. The overlay network may include a first computer network having a first network protocol carried by a second computer network having a second network protocol. The system may also include an agent carried by each of the publishers, the subscribers, and the brokers that adjust the network's topology based upon collected runtime data of condition of each link within the network and/or broker availability to any publisher and subscriber.

23 Claims, 7 Drawing Sheets

(56) References Cited

U.S. PATENT DOCUMENTS

| | | | |
|---|---|---|---|
| 2008/0239951 A1 | 10/2008 | Strom | 370/230 |
| 2008/0244025 A1 | 10/2008 | Ginis et al. | 709/206 |
| 2008/0244696 A1 | 10/2008 | Bhola et al. | 726/1 |
| 2008/0317028 A1 | 12/2008 | Chockler et al. | 370/390 |
| 2009/0252175 A1* | 10/2009 | Dempo | 370/400 |
| 2010/0103813 A1* | 4/2010 | Allan et al. | 370/218 |
| 2010/0208616 A1* | 8/2010 | Schieder et al. | 370/254 |
| 2011/0126108 A1* | 5/2011 | Beaudoin et al. | 715/734 |
| 2011/0243131 A1* | 10/2011 | Amir et al. | 370/390 |

OTHER PUBLICATIONS

Quiroz et al., A framework for distributed content-based Web services notification in Grid systems, Future Generation Computer Systems, vol. 24, No. 5, pp. 452-459 Elsevier Science B.V. (2007).

* cited by examiner

PUBLISH/SUBSCRIBE OVERLAY NETWORK CONTROL SYSTEM

BACKGROUND OF THE INVENTION

1. Field of the Invention

The invention relates to the field of computer systems, and, more particularly, to control systems of publisher/subscriber overlay networks to optimize selectable performance goals.

2. Description of Background

An overlay-based messaging system is a messaging paradigm for connecting applications belonging to different local domains distributed over wide area networks. In such systems, a number of end hosts form an overlay network by establishing long lived application-level connections among themselves. They use such overlay links to exchange control messages with each other and relay data messages for each other.

Usually each overlay node is associated with a local domain, where applications cannot communicate with applications in other domains directly due to virtual private network ("VPN") or firewall constraints. By using the overlay as an intermediate, and exchanging messages with the overlay, applications belonging to isolated domains distributed across wide area can communicate with each other.

SUMMARY OF THE INVENTION

According to one embodiment of the invention, a system to control an overlay network may include an overlay network linking a plurality of publishers, a plurality of subscribers, and a plurality of brokers. The overlay network may include a first computer network having a first network protocol carried by a second computer network having a second network protocol. The system may also include an agent carried by each of the publishers, the subscribers, and the brokers that adjust the network's topology based upon collected runtime data of condition of each link within the network and/or broker availability to any publisher and subscriber.

The collected runtime data may include link delay, traffic amount, link reliability, link utilization, and/or broker reliability. The system may further include a configuration interface to enable a user to define preferences for each of the publishers, the subscribers, the brokers, and the agents.

The preferences may include degree of redundancy, desired optimization goals such as minimizing total traffic amount, link utilization, and/or load balancing. The configuration interface may provide visual system performance data to a user.

The system may include at least one broker designated for each publisher and subscriber, and another broker replaces the at least one broker when a threshold comprising reliability and/or performance is not met by the at least one broker. The thresholds may be based upon the preferences and/or the collected runtime data.

The agent on one broker may communicate with an agent on another broker, and an agent on a publisher and an agent on a subscriber may communicate with an agent on a broker. The load balancing may comprise a broker splitting data amongst multiple links based upon the preferences. The network's topology may be adjusted based upon the preferences and/or variation in network conditions.

Another aspect of the invention is a method to control an overlay network. The method may include linking a plurality of publishers, a plurality of subscribers, and a plurality of brokers via an overlay network including a first computer network having a first network protocol carried by a second computer network having a second network protocol. The method may also include adjusting the network's topology based upon collected runtime data of the condition of each link within the network and/or broker availability to any publisher and subscriber.

The method may further include enabling a user to define preferences for each of the publishers, the subscribers, the brokers, and the agents via a configuration interface. The method may additionally include providing visual system performance data to a user via the configuration interface.

The method may also include designating at least one broker for each publisher and subscriber, and another broker replaces the at least one broker when a threshold comprising reliability and/or performance is not met by the at least one broker, and the thresholds are based upon the preferences and/or the collected runtime data. The method may further include adjusting the network's topology based upon the preferences and/or variation in network conditions.

Another aspect of the invention is a computer readable program codes coupled to tangible media to control an overlay network. The computer readable program codes may be configured to cause the program to link a plurality of publishers, a plurality of subscribers, and a plurality of brokers via an overlay network including a first computer network having a first network protocol carried by a second computer network having a second network protocol. The computer readable program codes may also adjust the network's topology based upon collected runtime data of at least one of condition of each link within the network and broker availability to any publisher and subscriber.

DETAILED DESCRIPTION OF THE INVENTION

The invention will now be described more fully hereinafter with reference to the accompanying drawings, in which preferred embodiments of the invention are shown. Like numbers refer to like elements throughout, like numbers with letter suffixes are used to identify similar parts in a single embodiment, and letter suffix lower case z is a variable that indicates an unlimited number of similar elements.

Figure 1:
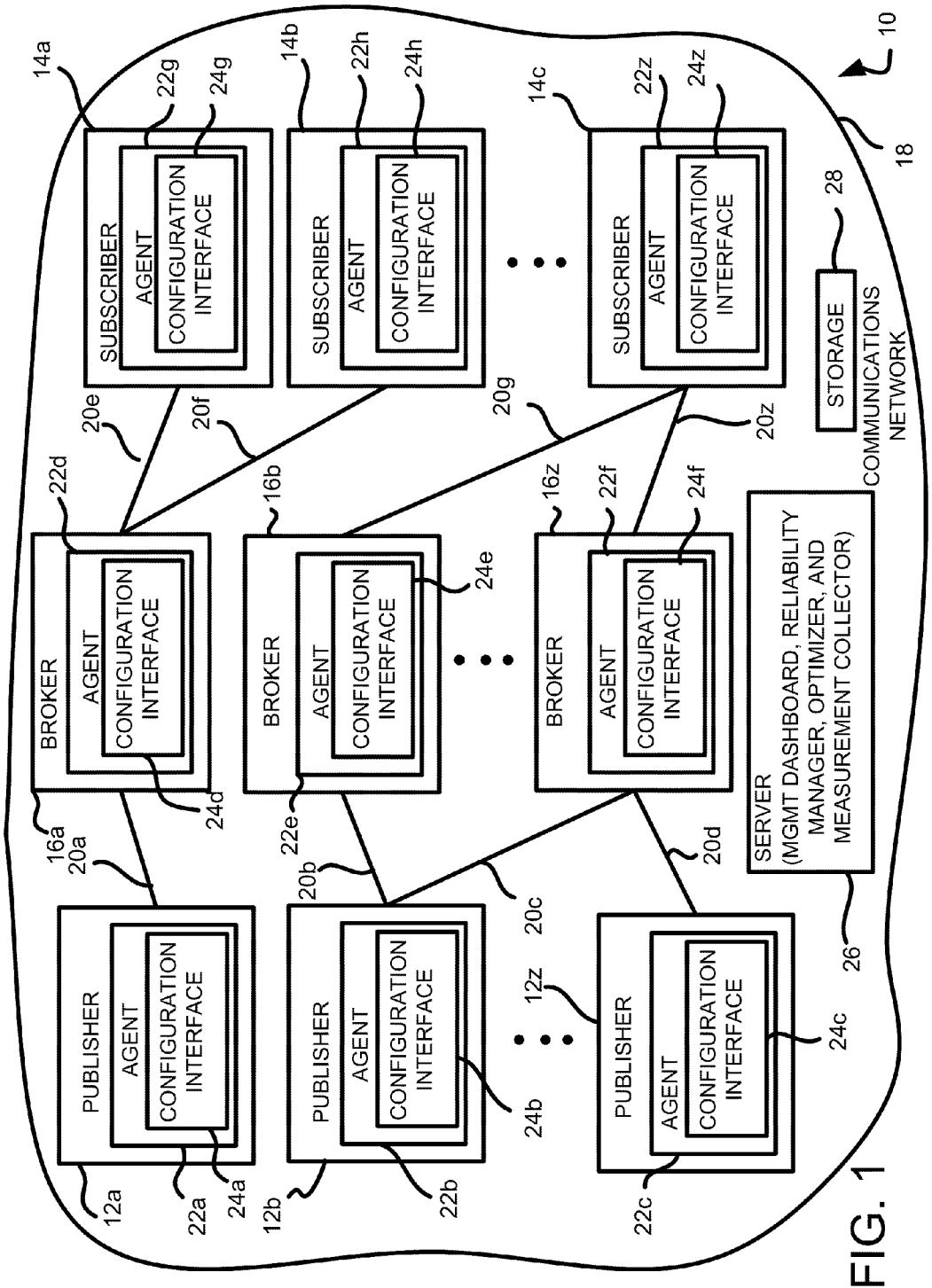
FIG. 1 is a schematic block diagram of a system to control an overlay network in accordance with the invention.

With reference now to FIG. 1, a system 10 to control a publish/subscribe overlay network 18 in a computer system is initially described. The system 10 is a programmable apparatus that stores and manipulates data according to an instruction set as will be appreciated by those of skill in the art.

According to one embodiment, the system 10 is a publish/subscribe communications paradigm that controls an overlay network. The system 10 includes any number of publishers 12a-12z, subscribers 14a-14z, and/or brokers 16a-16z. Each publisher 12a-12z, subscriber 14a-14z, and/or broker 16a-16z is a computer processing node as will be appreciated by those of skill in the art. Any of the computer processing nodes can be a respective publisher 12a-12z, subscriber 14a-14z, and/or broker 16a-16z at any given time.

In one embodiment, the system 10 includes a communications network 18, which enables a signal to travel between publishers 12a-12z, subscribers 14a-14z, brokers 16a-16z, and/or any other node within the communications network as well as to a node outside of the system. The communications network 18 is a wide area network, a local area network, the Internet, and/or the like, for example. The communications network 18 is wired and/or wireless, for example. The communications network 18 is local and/or global with respect to system 10, for instance.

In one embodiment, the system 10 includes an overlay network linking the publishers 12a-12z, the subscribers 14a-14z, and the brokers 16a-16z over communications links 20a-20z. The overlay network includes a first computer network having a first network protocol carried by a second computer network having a second network protocol, for example. The system 10 also includes an agent 22a-22z carried by each of the publishers 12a-12z, the subscribers 14a-14z, and the brokers 16a-16z that adjusts the network's topology based upon collected runtime data of conditions of each link 20a-20z within the network and/or broker 16a-16z availability to any publisher 12a-12z and subscriber 14a-14z.

In one embodiment, the collected runtime data includes link delay, traffic amount, link reliability, link utilization, and/or broker reliability. In another embodiment, the system 10 further includes a configuration interface 24a-24z to enable a user (not shown) to define preferences for each of the publishers 12a-12z, the subscribers 14a-14z, the brokers 16a-16z, and/or the agents 22a-22z.

In one embodiment, the preferences include degree of redundancy, desired optimization goals such as minimizing total traffic amount, link utilization, and/or load balancing. In another embodiment, the configuration interface 24a-24z provides visual system performance data to the user.

In one embodiment, the system 10 includes at least one broker 16a-16z designated for each publisher 12a-12z and subscriber 14a-14z, and another broker replaces the at least one broker when a threshold comprising reliability and/or performance is not met by the at least one broker. In another embodiment, the thresholds are based upon the preferences and/or the collected runtime data.

In one embodiment, the agent 22a-22z on one broker 16a-16z communicates with an agent on another broker, and an agent on a publisher 12a-12z and an agent on a subscriber 14a-14z communicate with an agent on a broker. In another embodiment, the load balancing comprises a broker 16a-16z splitting data amongst multiple links 20a-20z, e.g. paths, based upon the preferences. In another embodiment, the network's topology is adjusted based upon the preferences and/or variation in network conditions.

In one embodiment, the server 26 carries a management dashboard that allows users to declaratively define their preferences, e.g., degree of redundancy, or what to optimize such as total traffic amount, load balancing, and/or the like.

In another embodiment, the management dashboard also provides visualization of system 10 performance.

In one embodiment, and based on user's preferences, a reliability manager carried by server 26 configures a measurement collector, which instructs agents 22a-22z to collect necessary performance data. In another embodiment, the reliability manager also instructs an optimizer about optimization goals, e.g. minimize total traffic amount, minimize the max link utilization, and/or the like. As discussed in more detail below, the optimizer may be configured to automatically select at least one backup bridge and data path of each subscriber 14a-14c such that certain optimization goals are met, including but not limited to at least one of minimizing the total traffic, link utilization or unbalanced load in overlay network 18, and minimizing publisher to subscriber latency, subject to maximum traffic, capacity and delay constraints of links 20a-20z in the overlay network 18.

In one embodiment, the optimizer computes the set of optimal home brokers 16a-16z for each publisher 12a-12z and subscriber 14a-14z. In another embodiment, the selection of optimal home brokers 16a-16z is subject to constraints such as link capacity, delay, utilization, reliability requirements, and/or the like.

In one embodiment, the reliability manager uses the optimization solution to configure the publishers 12a-12z and subscribers 14a-14z, and the subscriber/publisher connect to the set of home brokers 16a-16z. In another embodiment, the subscriber 14a-14z and publisher 12a-12z use only one home broker 16a-16z to receive and send messages. The agent 22a-22z keeps monitoring the liveliness of current active home broker 16a-16z, and when the current active home broker fails, the subscriber 14a-14z and publisher 12a-12z switches to a different home broker, possibly specified in the configuration.

In one embodiment, the reliability manager can automatically maintain the optimal broker 16a-16z selection against dynamic network conditions. In another embodiment, it can re-optimize the selection and re-configure the system periodically, or upon major network condition changes. In another embodiment, the reliability manager can configure brokers 16a-16z to satisfy performance goals such as how much data to send along which link 20a-20z for a broker to achieve load balancing.

In one embodiment, a configurable monitoring agent 22a-22z is deployed for each publisher 12a-12z, subscriber 14a-14z, and broker 16a-16z, for the collection of necessary performance data. In another embodiment, a configuration interface 24a-24z in each publisher 12a-12z, subscriber 14a-14z, and broker 16a-16z enables dynamic runtime configuration. In another embodiment, performance data is stored in storage 28.

In one embodiment, the agent 22a-22z on one broker 16a-16z communicates with agents on other connected brokers. In another embodiment, two agents 22a-22z exchange messages to measure network conditions, including but not limited to, the liveliness of the other broker, the link delay, reliability, utilization, traffic amount, and/or the like.

In one embodiment, the agent 22a-22z on a publisher 12a-12z or subscriber 14a-14z communicates with agents on the brokers 16a-16z. In another embodiment, the agent 22a-22z on a publisher 12a-12z or subscriber 14a-14z can be configured with the required degree of redundancy and/or the desired delay requirements. The agent and/or subscriber can measure such attributes as the message rate.

In one embodiment, the agent 22a-22z detects the failure of another if the other misses a threshold number of consecutive ping messages. In another embodiment, the agent 22a-22z measures the delay by averaging the round trip time over an overlay link 20a-20z.

In one embodiment, the agent 22a-22z measures the traffic amount by counting the amount of messages sent over an overlay link 20a-20z within a unit of time. In another embodiment, the agent 22a-22z uses algorithms such as the Exponential Weighted Moving Average (EWMA) to produce the measurement that can be used by the measurement collector.

In one embodiment, the optimizer receives optimization goals from the reliability manager, where the goals can be, but not limited to, minimum total message overhead, minimum link utilization, maximum load balancing, and/or the like. In another embodiment, the optimizer receives the required degree of resiliency, e.g. the number of home brokers 16a-16z needed for each publisher 12a-12z and subscriber 14a-14z pair.

In one embodiment, the optimizer retrieves relevant measurement data from the storage 28 and generates optimization constraints. In another embodiment, the optimizer applies optimization algorithms such as integer programming to compute both the optimal configuration parameters for publishers 12a-12z/subscribers 14a-14z, such as the set of home brokers 16a-16z for each publisher/subscriber, the active home broker, the switching order among home brokers.

In one embodiment, the optimizer also computes the optimal parameters for brokers 16a-16z, such as the set of links 20a-20z between each pair of brokers, the amount of traffic to forward over different links, and/or the like. In another embodiment, the optimizer configures each publisher 12a-12z/subscriber 14a-14z and broker 16a-16z for the optimal parameters, such as the set of home brokers, the paths for data delivery for each message type.

In one embodiment, the management dashboard accepts user preferences input. In another embodiment, users can input preferences including the degree of redundancy, the optimization goals such as the total overhead, the link utilization, the load balancing, and/or the like.

In one embodiment, the dashboard sends such preferences to the reliability manager. In another embodiment, the dashboard can also receive performance data and visualize the performance of the whole pub/sub system.

In one embodiment, the reliability manager configures the optimizer, the measurement collector, and the pub/sub system. In another embodiment, the reliability manager receives user preferences on reliability and performance from the management dashboard.

In one embodiment, the reliability manager configures the measurement collector to collect appropriate data from agents 22a-22z. In another embodiment, the reliability manager configures the optimizer of optimization problem and goals In one embodiment, the measurement collector collects the measurements from the agents 22a-22z. In another embodiment, the measurement collector configures agents 22a-22z about what performance measurement data to produce.

In one embodiment, the measurement collector can listen on a certain network address and port, waiting for agents 22a-22z to send measurements. In another embodiment, the measurement collector can poll agents 22a-22z one by one about the measurement results. In another embodiment, the measurement collector stores all measurement results in storage 28.

In one embodiment, the publisher 12a-12z and subscriber 14a-14z connects to the set of home brokers 16a-16z and use one or multiple of them as active broker(s). In another embodiment, the agent 22a-22z on the publisher 12a-12z and subscriber 14a-14z monitors the liveliness of home brokers 16a-16z.

In one embodiment, the publisher 12a-12z and subscriber 14a-14z send/receive message through the active home broker(s) 16a-16z. When the agent 22a-22z finds the active home broker 16a-16z has failed, it instructs the publisher/subscriber to switch to a different home broker.

In one embodiment, the broker 16a-16z establishes links 20a-20z, e.g. paths, and sends data along these paths as indicated by optimal parameters. In another embodiment, the broker 16a-16z splits the data among multiple paths 20a-20z to achieve load balancing, as indicated by optimal parameters.

In one embodiment, the system 10 can automatically re-optimize the pub/sub system when network conditions or user preferences change. In another embodiment, the reliability manager can instruct the optimizer to recompute the optimal parameters, either periodically, or upon significant variations in network conditions, or changes in user preferences.

In one embodiment, if the newly computed optimal home broker 16a-16z selection, or message paths 20a-20z differ from the previous computation, the optimizer notifies respective publishers 12a-12z, subscribers 14a-14z, and brokers 16a-16z. The notified publishers 12a-12z and subscribers 14a-14z are reconfigured with new parameters and act accordingly, such as disconnecting old home brokers 16a-16z not in the new set, and connecting to new home brokers. The notified brokers 16a-16z are configured with new parameters and act accordingly, such as tearing down old paths 20a-20z and establishing new paths.

In one embodiment, the first bridge is always the local node and the path, and the amount of traffic incurred to deliver data to the local node is given. Thus, the selection for the secondary bridge, and which path (if the node is not already receiving the traffic) to use for that bridge, needs to be determined. The general formulation for a given overlay topology and a set of publisher/subscribers, find the k bridge selection for each subscriber where the total traffic is reduced and delay constraints are satisfied.

Some simplifying assumptions are determined such as a single topic T and delay constraint D between any publisher/subscriber pair. And, the maximum amount of traffic over any link $b_{th}$, and delay is relatively constant over a link. In addition, delays from different nodes in a LAN to a WAN node are the same, one publisher 12a-12z and one subscriber 14a-14z at each overlay node, and all paths 20a-20z between any two nodes can be pre-computed.

Figure 2:
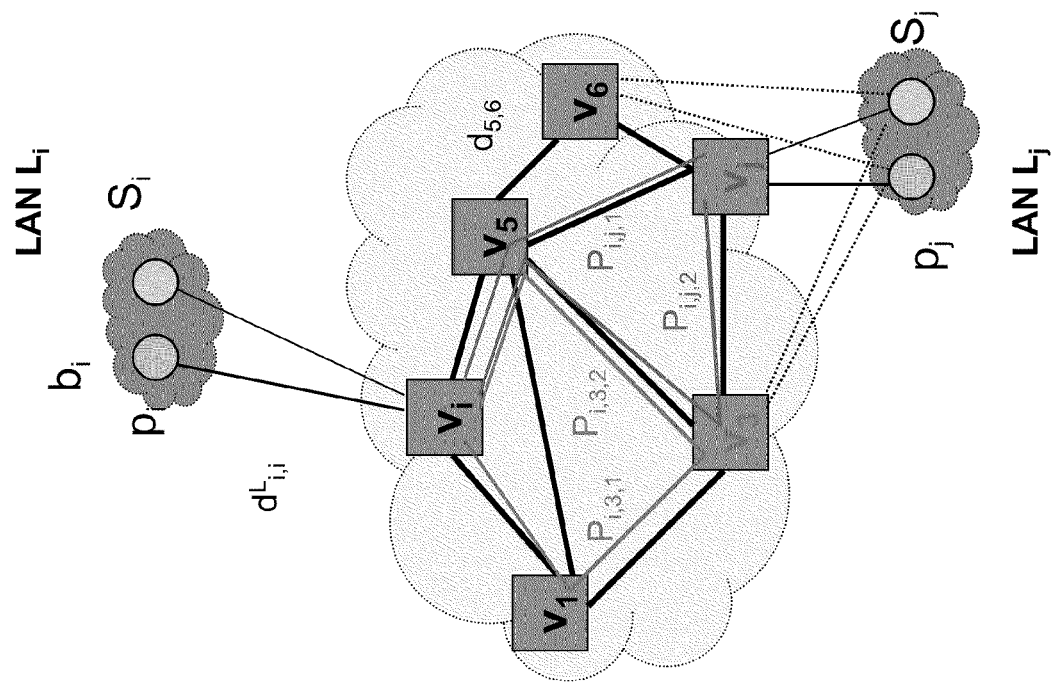
FIG. 2 is a schematic block diagram of bridge selection in accordance with the invention.

With additional reference now to FIG. 2, a simplified formulation is given where:

Overlay topology G=(V,E), with V nodes, E edges.

$d_{i,j}$: delay between nodes $v_i$, $v_j$, $c_{i,j}$: capacity over edge/link $e_{i,j}$ $d^L_{i,j}$: delay between any publisher/subscriber in $LAN_i$ and $v_j$ A publisher $p_i$ and subscriber $s_i$ for each $v_i$ Amount of traffic $b_i$ for each $p_i$ Next, you precompute $K_{i,j}$ paths between $v_i$ and $v_j$ such that $d_{i,j,k}$ is the path delay and $d_{i,j,k} \leq D - d^L_{i,i} - d^L_{j,j}$ $h_{i,j,k}$ is the path length $f_{i,j,k,m,n}=1$ if $e_{m,n}$ is on the $k_{th}$ path, 0 otherwise $R_{i,j,k,m,n}$: the number of common links between path $P_{i,j,k}$ and $P_{i,m,n}$ E.g., $R_{i,j,1,3,2}=1$, $R_{i,j,1,3,1}=0$ For each publisher pi and node vj, decision vector $Y_{i,j} = [y_{i,j,1}, \ldots, y_{i,j,k}, \ldots, y_{i,j,Ki,j}]$ $y_{i,j,k} = 1$ if the kth path is chosen, otherwise 0

Only one path is chosen, i.e., $SUM_{k=1, \ldots, Ki,j} y^{i,j,k} = 1$

For each subscriber $s_i$, second bridge selection vector $X_i = [x_{i,1}, \ldots, x_{i,j}, \ldots, x_{i,v}]$ $x_{i,j} = 1$ if $v_j$ is chosen, otherwise 0

Only one node is chosen, i.e., $SUM_{j=1, \ldots, v} x_{i,j} = 1$

And, objective functions are given where:

Total overhead: H=A−B

A: Sum the traffic from publisher $p_i$ to node $v_j$ over the $k_{th}$ path, over all i,j,k $SUM_i \ SUM_j \ SUM_k y_{i,j,k} \ h_{i,j,k} \ b_i$ B: Sum the redundant traffic from $p_i$ to two nodes $v_j$ and $v_m$, over all i,j,n $SUM_i \ SUM_j \ SUM_n \ y_{i,j,k} \ y_{i,m,n} \ R_{i,j,k,m,n} \ b_i$ Traffic $b_{p,q}$ on edge $e_{p,q}$: $b_{p,q} = b_1 - b_2$ $b_1$: traffic from $p_i$ to $v_j$, using path $P_{i,j,k}$, summed over all i,j,k $SUM_i \ SUM_j \ SUM_k \ y_{i,j,k} \ f_{i,j,k,p,q} \ b_i$ $b_2$: redundant traffic from $p_i$ to nodes $v_j$ and $v_m$ where $e_{p,q}$ is a common link on path $P_{i,j,k}$ and $P_{i,m,n}$, summed over all i,j,k,m,n $SUM_i \ SUM_j \ SUM_k \ SUM_m \ SUM_n \ y_{i,j,k} \ y_{i,m,n} \ f_{i,j,k,p,q} \ f_{i,m,n,p,q} \ b_i$ And, optimization is given where finding which path to choose to deliver traffic from $p_i$ to $v_j$, to minimize total overhead subject to maximum link traffic and capacity constraints are determined as follows:

MIN H, subjecting to

MAX $b_{p,q} < b_{th}$ $b_{p,q} < c_{p,q}$

And, finding which secondary bridge node to select for each $s_i$, such that delay constraints are satisfied are determined as follows:

For each $p_i \ v_j$ pair, the chosen path $k_c$ is known from the previous problem $D_{i,j,kc}$ is also known Find $x_{i,j}$ values such that for each publisher $p_l$ $d^L_{l,i} + x_{i,j} \ d_{i,j,kc} + d^L_{j,i} <= D$ As a result, the system 10 provides backups when a local domain's overlay node fails, thereby enabling uninterrupted operations of such messaging systems. In one embodiment, the overlay node acts as a bridge that connects local applications to wide area networks. If the bridge, e.g. communications links 20a-20z, fails due to machine hardware failure or software bugs, local applications lose their only connectivity to the outside world. To this end, a local domain may choose other overlay nodes as backup bridges. Thus, applications can switch to backups if their local bridge fails.

The system 10 facilitates deciding which other overlay nodes to choose as backup. Given an overlay messaging system's configuration, including which local domain has publishers 12a-12z and subscribers 14a-14z for which topics, the amount of traffic generated by each publisher, the delay, capacity on each overlay link and delay requirements for applications, and the number of concurrent failures to tolerate, system 10 decides the backup bridge selection for each local domain that reduces the message overhead, while satisfying the delay requirements of applications.

In one embodiment, the system 10 comprises two parts. One part is collecting the measurements of the existing overlay network, e.g. communication links 20a-20z. This includes the delay and capacity for each overlay link, which can be measured periodically, the topics published and subscribed at each local domain, and the message rates for each publisher 12a-12z, which can be collected from each domain. All such information can be sent to a server 26, which runs software such as CPLEX and produces the backup bridge selection for each local domain. Then each local domain can be configured accordingly. Depending on how frequent and how much the measurements change, the central server may run this operation periodically or on demand to produce new backup selections for the current system.

In one embodiment, the bridge selection can be formulated as an integer optimization problem, the goal of which is to reduce the total amount of traffic in the whole network 20a-20z. There are mainly two kinds of constraints. One from the network, where the amount of traffic flowing on any overlay link 20a-20z cannot exceed its capacity. The other from applications, where the end to end delay between each publisher 12a-12z and subscriber 14a-14z pair on a certain topic should be no greater than the given threshold for that topic. Besides network measurements, another input to the formulation is the degree of redundancy such as how many back up bridges are needed. In general K bridges tolerate up to K-1 concurrent bridge failures.

Depending on the overlay network's requirements, a different optimization goal can be the load balancing among all overlay links, e.g., the maximum amount of traffic on any overlay link 20a-20z should not exceed a certain threshold. This is useful for achieving "fairness" among different links 20a-20z so that no link carries an extraordinary amount of traffic. Such "fairness" might be desirable when the overlay is formed among different organizations and companies each of which wants to reduce its operation costs.

Figure 3:
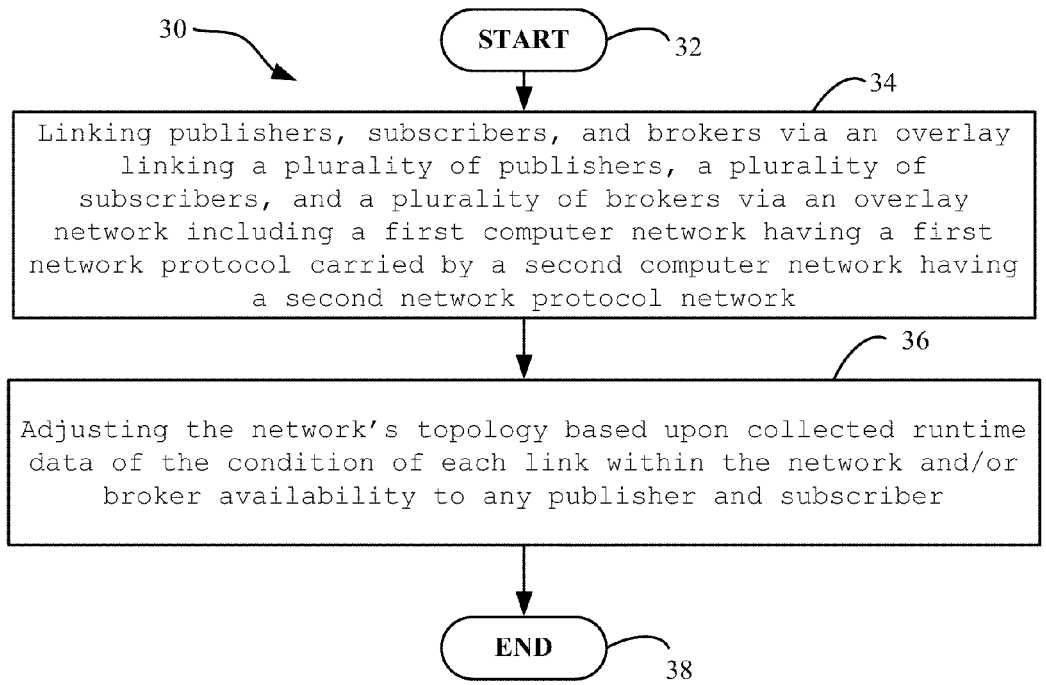
FIG. 3 is a flowchart illustrating method aspects according to the invention.

Another aspect of the invention is a method to control a publish/subscribe overlay network, which is now described with reference to flowchart 30 of FIG. 3. The method begins at Block 32 and may include linking a plurality of publishers, a plurality of subscribers, and a plurality of brokers via an overlay network including a first computer network having a first network protocol carried by a second computer network having a second network protocol at Block 34. The method may also include adjusting the network's topology based upon collected runtime data of the condition of each link within the network and/or broker availability to any publisher and subscriber at Block 36. The method ends at Block 38.

Figure 4:
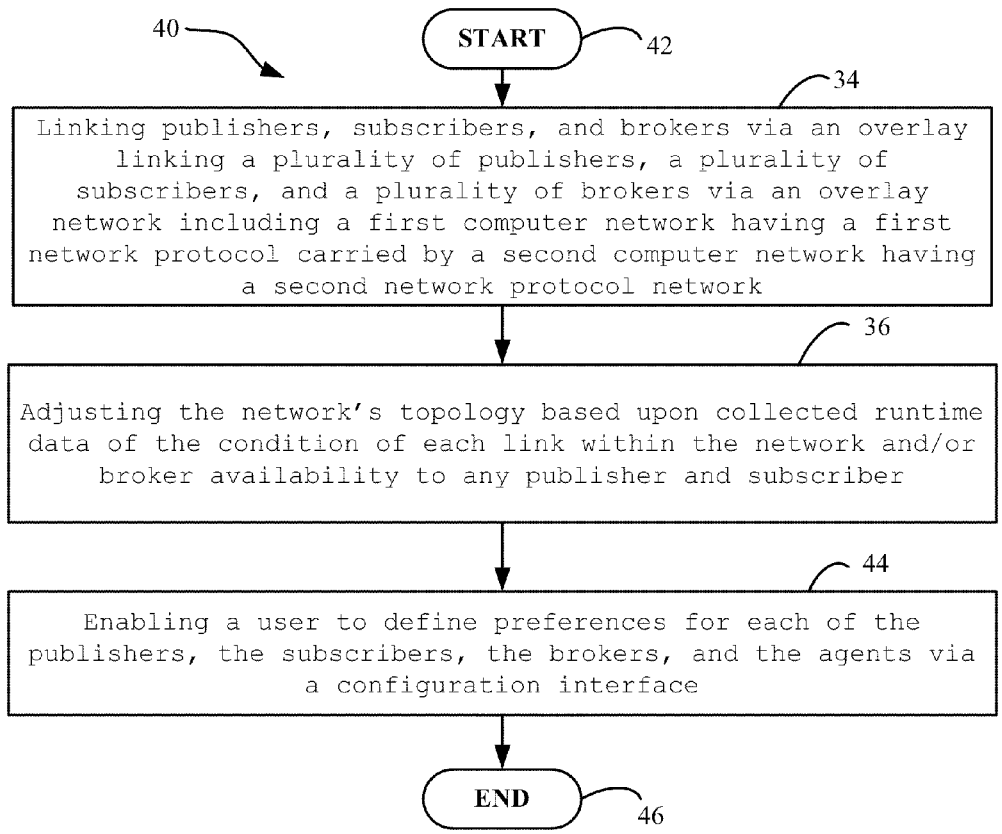
FIG. 4 is a flowchart illustrating method aspects according to the method of FIG. 3.

In another method embodiment, which is now described with reference to flowchart 40 of FIG. 4, the method begins at Block 42. The method may include the steps of FIG. 3 at Blocks 34 and 36. The method may additionally include enabling a user to define preferences for each of the publishers, the subscribers, the brokers, and the agents via a configuration interface at Block 44. The method ends at Block 46.

Figure 5:
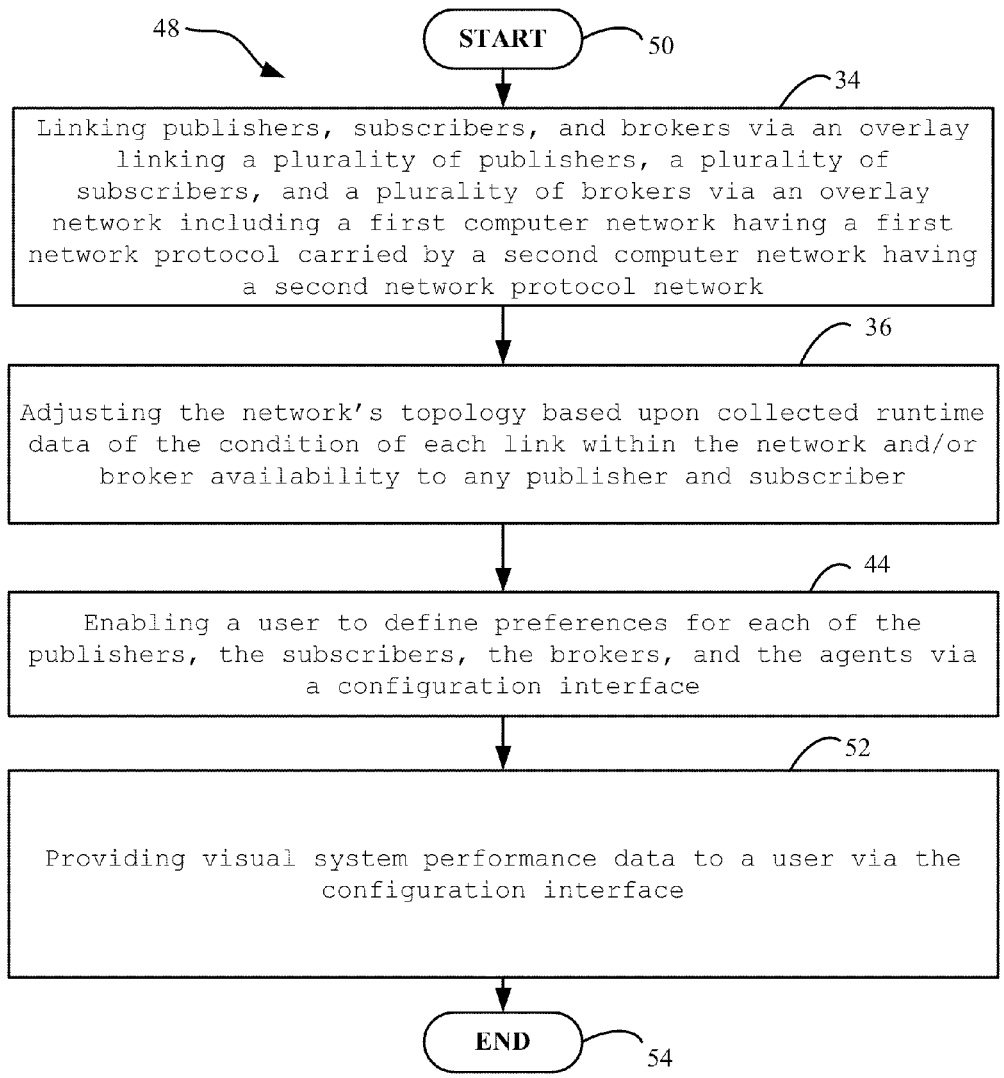
FIG. 5 is a flowchart illustrating method aspects according to the method of FIG. 4.

In another method embodiment, which is now described with reference to flowchart 48 of FIG. 5, the method begins at Block 50. The method may include the steps of FIG. 4 at Blocks 34, 36, and 44. The method may additionally include providing visual system performance data to a user via the configuration interface at Block 52. The method ends at Block 54.

Figure 6:
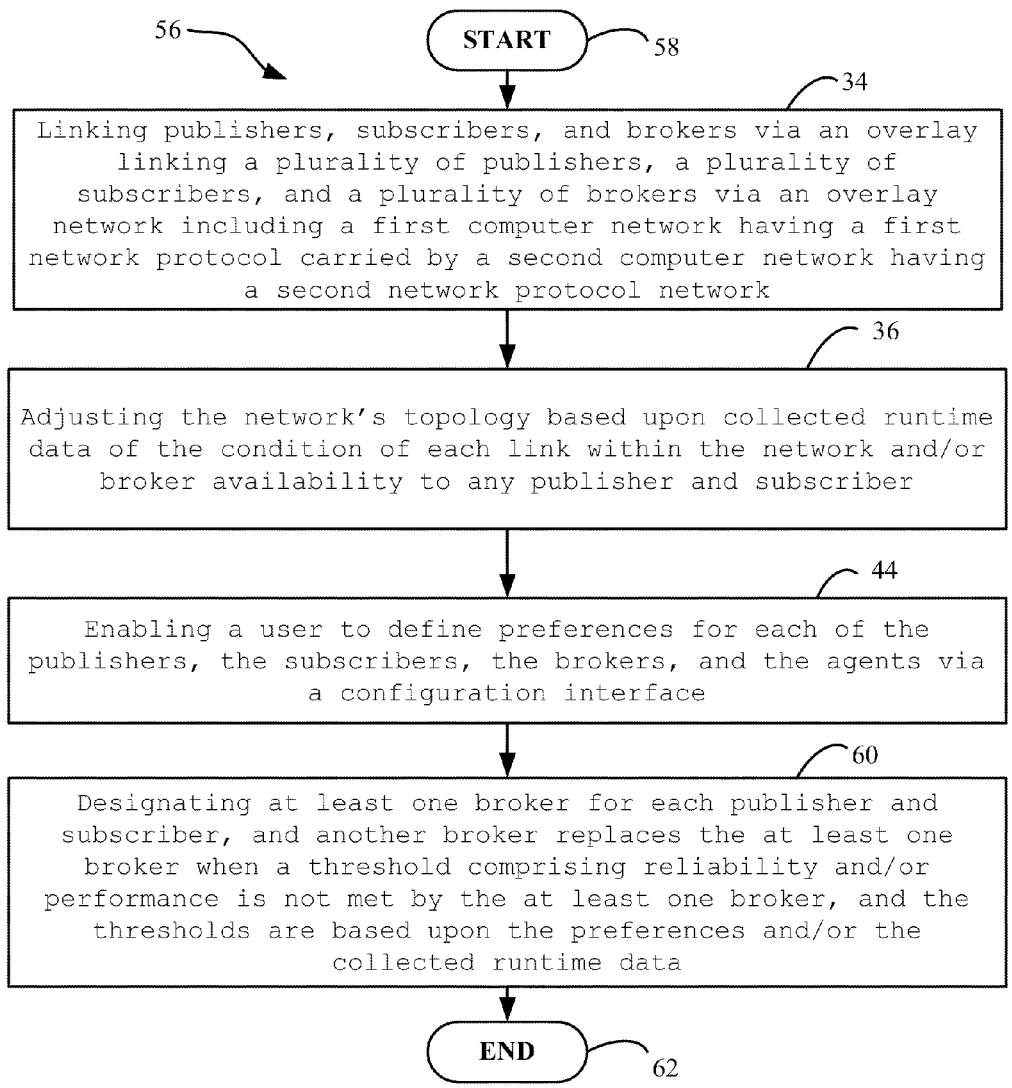
FIG. 6 is a flowchart illustrating method aspects according to the method of FIG. 4.

In another method embodiment, which is now described with reference to flowchart 56 of FIG. 6, the method begins at Block 58. The method may include the steps of FIG. 4 at Blocks 34, 36, and 44. The method may additionally include designating at least one broker for each publisher and subscriber, and another broker replaces the at least one broker when a threshold comprising reliability and/or performance is not met by the at least one broker, and the thresholds are based upon the preferences and/or the collected runtime data at Block 60. The method ends at Block 62.

Figure 7:
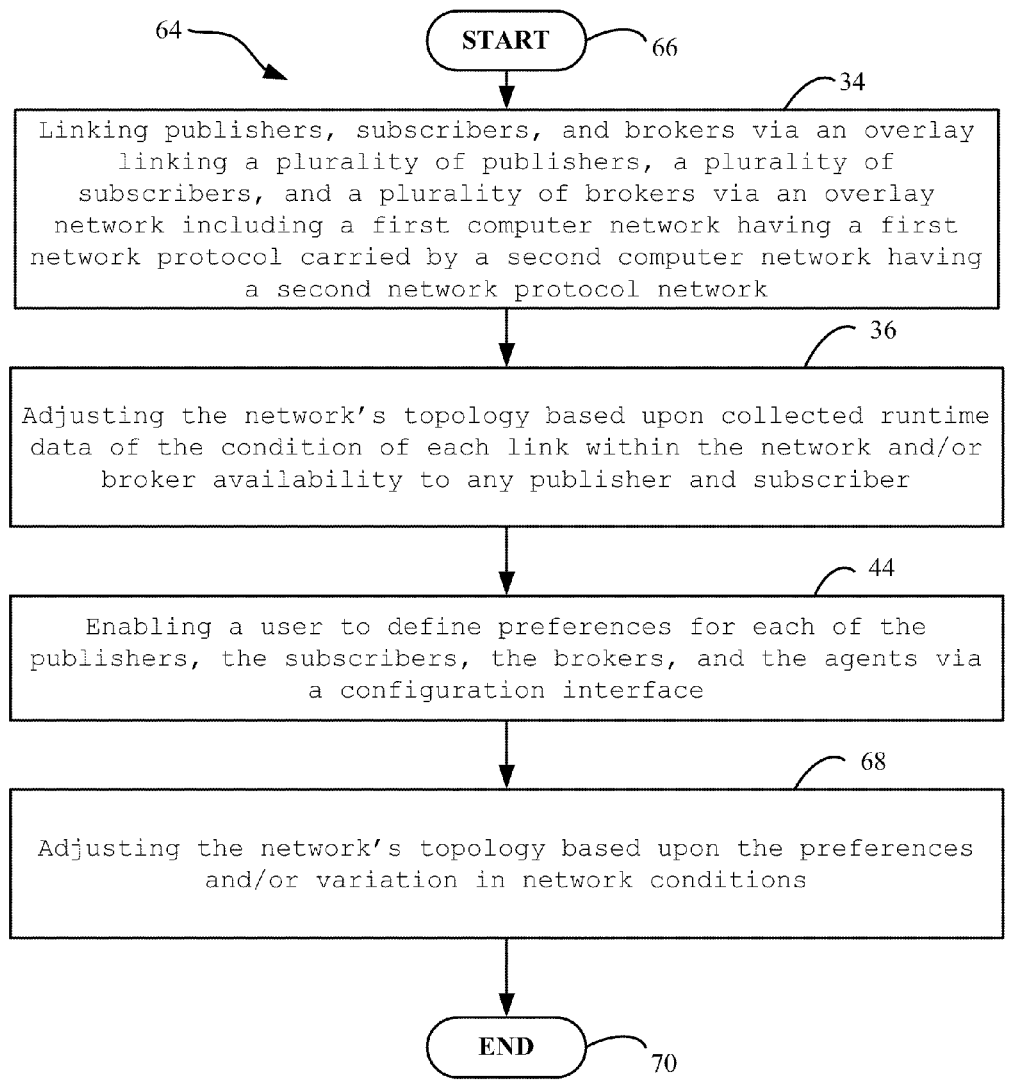
FIG. 7 is a flowchart illustrating method aspects according to the method of FIG. 4.

In another method embodiment, which is now described with reference to flowchart 64 of FIG. 7, the method begins at Block 66. The method may include the steps of FIG. 4 at Blocks 34, 36, and 44. The method may additionally include adjusting the network's topology based upon the preferences and/or variation in network conditions at Block 68. The method ends at Block 70.

Another aspect of the invention is a computer readable program codes coupled to tangible media to control an overlay network. The computer readable program codes may be configured to cause the program to link a plurality of publishers $12a$-$12z$, a plurality of subscribers $14a$-$14z$, and a plurality of brokers $16a$-$16z$ via an overlay network including a first computer network having a first network protocol carried by a second computer network having a second network protocol. The computer readable program codes may also adjust the network's topology based upon collected runtime data of at least one of condition of each link $20a$-$20z$ within the network and broker $16a$-$16z$ availability to any publisher $12a$-$12z$ and subscriber $14a$-$14z$.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system comprising:
   a plurality of computers;
   an overlay network linking the plurality of computers, the plurality of computers including a plurality of publishers, a plurality of subscribers, and a plurality of brokers, the overlay network including a first computer network having a first network protocol, the first computer network carried by a second computer network having a second network protocol;
   an agent carried by each of the publishers, the subscribers, and the brokers that adjusts the network's topology based upon collected runtime data of at least one of condition of each link within the network and broker availability to any publisher and subscriber; and
   an optimizer to automatically select at least one backup bridge and data path of each of the subscribers when a local domain's overlay node fails such that total traffic in the overlay network is minimized and message delay constraints between publisher and subscriber pairs are satisfied.

2. The system of claim 1 wherein the collected runtime data includes at least one of link delay, traffic amount, link reliability, link utilization, and broker reliability.

3. The system of claim 1 further comprising a configuration interface to enable a user to define preferences for each of the publishers, the subscribers, the brokers, and the agents.

4. The system of claim 3 wherein the preferences comprise at least one of degree of redundancy, and optimization of one of minimizing total traffic amount, link utilization, and unbalanced load.

5. The system of claim 3 wherein the configuration interface provides visual system performance data to a user.

6. The system of claim 3 wherein at least one broker is designated for each publisher and subscriber and another broker replaces the at least one broker when a threshold comprising at least one of reliability and performance is not met by the at least one broker.

7. The system of claim 6 wherein the thresholds are based upon the preferences and the collected runtime data.

8. The system of claim 1 wherein an agent on one broker communicates with an agent on another broker, and an agent on a publisher and an agent on a subscriber communicate with an agent on a broker.

9. The system of claim 4 wherein load balancing comprises a broker splitting data amongst multiple links based upon the preferences.

10. The system of claim 3 wherein the network's topology is adjusted based upon at least one of the preferences and variation in network conditions.

11. The system of claim 1 wherein the optimizer is further configured to automatically select the at least one backup bridge and data path of the subscribers such that certain optimization goals are met, including one of at least link utilization, unbalanced load, and minimizing publisher to subscriber latency, subject to maximum traffic, capacity and delay constraints of links in the overlay network.

12. A method comprising:
   linking a plurality of computers, the plurality of computers including a plurality of publishers, a plurality of subscribers, and a plurality of brokers via an overlay network including a first computer network having a first network protocol, the first computer network carried by a second computer network having a second network protocol;
   adjusting the network's topology based upon collected runtime data of at least one of condition of each link within the network and broker availability to any publisher and subscriber; and
   automatically selecting at least one backup bridge and data path of each of the subscribers when a local domain's overlay node fails such that total traffic in the overlay network is minimized and message delay constraints between publisher and subscriber pairs are satisfied.

13. The method of claim 12 further comprising enabling a user to define preferences for each of the publishers, the subscribers, the brokers, and the agents via a configuration interface.

14. The method of claim 13 further comprising providing visual system performance data to a user via the configuration interface.

15. The method of claim 13 further comprising designating at least one broker for each publisher and subscriber, and another broker replaces the at least one broker when a threshold comprising at least one of reliability and performance is not met by the at least one broker, and the thresholds are based upon the preferences and the collected runtime data.

16. The method of claim 13 further comprising adjusting the network's topology based upon at least one of the preferences and variation in network conditions.

17. The method of claim 12 wherein automatically selecting the at least one backup bridge and data path of the subscribers includes automatically selecting the at least one backup bridge and data path such that certain optimization goals are met, including one of at least link utilization, unbalanced load, and minimizing publisher to subscriber latency, subject to maximum traffic, capacity and delay constraints of links in the overlay network.

18. A computer program product embodied in a non-transitory computer usable medium comprising:
   computer readable program codes coupled to the non-transitory computer usable medium to control an overlay network, the computer readable program codes configured to cause the program to:
   link a plurality of publishers, a plurality of subscribers, and a plurality of brokers via an overlay network including a first computer network having a first network protocol, the first computer network carried by a second computer network having a second network protocol;
   adjust the network's topology based upon collected runtime data of at least one of condition of each link within the network and broker availability to any publisher and subscriber; and
   select at least one backup bridge and data path of each of the subscribers when a local domain's overlay node fails such that total traffic in the overlay network is minimized and message delay constraints between publisher and subscriber pairs are satisfied.

19. The computer program product of claim 18 further comprising program code configured to: enable a user to define preferences for each of the publishers, the subscribers, the brokers, and the agents via a configuration interface.

20. The computer program product of claim 19 further comprising program code configured to: provide visual system performance data to a user via the configuration interface.

21. The computer program product of claim 19 further comprising program code configured to: designate at least one broker for each publisher and subscriber, and another broker replaces the at least one broker when a threshold comprising at least one of reliability and performance is not met by the at least one broker, and the thresholds are based upon the preferences and the collected runtime data.

22. The computer program product of claim 19 further comprising program code configured to: adjust the network's topology based upon at least one of the preferences and variation in network conditions.

23. The computer program product of claim 18 wherein the program code to select at least one backup bridge and data path of each of the subscribers includes program code configured to: select the at least one backup bridge and data path of each subscriber such that certain optimization goals are met, including one of at least link utilization, unbalanced load, and minimizing publisher to subscriber latency, subject to maximum traffic, capacity and delay constraints of links in the overlay network.

* * * * *